United States Patent [19]

Belz et al.

[11] Patent Number: 4,870,148

[45] Date of Patent: Sep. 26, 1989

[54] THERMOPLASTIC POLYMER AND ARTICLES MADE FROM A THERMOPLASTIC POLYMER

[75] Inventors: Roland K. Belz, Leinfelden-Echterdingen; Heinrich Deibig, Frankfurt, both of Fed. Rep. of Germany

[73] Assignees: RB Kunststoffpatent-Verwertungs AG; Belland AG, both of Switzerland

[21] Appl. No.: 62,369

[22] Filed: Jun. 12, 1987

Related U.S. Application Data

[63] Continuation of Ser. No. 715,525, Oct. 2, 1984, abandoned.

[30] Foreign Application Priority Data

Oct. 4, 1983 [DE] Fed. Rep. of Germany ....... 3335954

[51] Int. Cl.$^4$ ................. C08F 220/12; C08F 220/06; C08F 216/18
[52] U.S. Cl. .......................... 526/318.41; 526/318.45; 526/318.44
[58] Field of Search .................. 526/318.45, 318.41, 526/318.44

[56] References Cited

U.S. PATENT DOCUMENTS

| | | | |
|---|---|---|---|
| 2,851,448 | 9/1958 | Slocombe | 526/318.45 |
| 3,959,237 | 5/1976 | Blank | 526/318.44 |
| 3,980,602 | 9/1976 | Jakubauskas | 526/318.44 |
| 4,021,504 | 5/1977 | Conrad | 526/318.44 |
| 4,041,231 | 8/1977 | Gross | 526/318.44 |
| 4,062,817 | 12/1977 | Westerman | 526/318.44 |
| 4,085,264 | 4/1978 | Seib | 526/318.44 |
| 4,226,754 | 10/1980 | Yun | 526/318.44 |
| 4,261,066 | 4/1981 | Belz | 428/65 |
| 4,379,881 | 4/1983 | Peck | 526/318.44 |
| 4,425,326 | 1/1984 | Guillon | 536/318.44 |
| 4,469,728 | 9/1984 | Belz | 428/65 |
| 4,551,369 | 11/1985 | Belz | 428/68 |

*Primary Examiner*—C. Warren Ivy
*Attorney, Agent, or Firm*—Steele, Gould & Fried

[57] ABSTRACT

The invention relates to polymers, which are produced through using organic acids, together with the products obtained therefrom. The polymers and the products obtained therefrom are insoluble in water, but soluble in an alkaline medium. There are numerous interesting possible uses for the polymers.

7 Claims, No Drawings

THERMOPLASTIC POLYMER AND ARTICLES MADE FROM A THERMOPLASTIC POLYMER

This is a continuation of application Ser. No. 715,525, filed Oct. 2, 1984, now abandoned.

EP-OS 32244 describes a composite film, in which one coating forms a water-insoluble material, which is soluble in an acid or basic, aqueous medium. This material is preferably a copolymer of an unsaturated organic carboxylic acid with a neutral monomer. Numerous examples for the individual monomers are given.

It has now been found that a polymer of 2.5 to 6 mol of at least one acrylate per mol of acrylic acid and/or methacrylic acid, 0 to 0.5 mol of a termonomer and conventional polymerization additives has particularly good properties, particularly with respect to the elasticity, strength and clearly defined dissolving capacity in an alkaline medium. The acrylate is preferably an ester with an alcohol with 1 to 18 carbon atoms, particularly methyl acrylate or ethyl acrylate. The polymer can be a copolymer or a terpolymer and a particularly suitable termonomer is a monomer from the group vinyl ethers with 3 to 18 carbon atoms, particularly vinyl isobutyl ether, aromatic vinyl hydrocarbons with 8 to 11 carbon atoms, specially styrene, acrylate or methacrylate with an alcohol residue with 1 to 18 carbon atoms, particularly n-butyl acrylate, butyl methacrylate and stearyl methacrylate. The acrylate to organic acid mol ratio both in the case of the copolymer and in the case of the terpolymer is preferably 3:1 to 5:1, especially 4:1. In the terpolymer, the organic acid to termonomer ratio is preferably 1:0.1 to 1:0.4, particularly 1:0.2 to 1:0.3.

The polymerization initiator used can be employed in quantities of 0.5 to 25 mmol/mol of monomer total mixture. By varying the quantity, it is possible to control the molecular weight of the polymer. Generally, 1 to 10 mmol, especially approximately 6 mmol/mol of total monomer is used.

The polymers can be produced in the conventional manner, but are preferably produced in at least one extruder. The monomers are individually or in mixed form supplied to the feed point of an extruder, particularly a tightly meshing twin-screw extruder and are polymerized accompanied by heating and optional cooling of the individual extruder zones. A plurality of extruders can be successively arranged in cascade-like manner. It is also possible to distill off at normal pressure or draw off in vacuo excess monomers at individual points of the extruder. A suitable process is described in German Patent Application P 33 35 954.7 of October 4th 1983 and the corresponding European Patent Application 48 10 95 69.8 of August 10th 1984, to which reference is made.

The carboxyl group content of the polymers is preferably between 5 and 15%, particularly between 7 and 13%. It has been found that the carboxyl content of the polymers measured on the produce in the case of production in the extruder is generally somewhat higher than the theoretical value. This is due to the fact that as a rule, part of the neutral monomer is removed in vaporous form.

Particularly preferred terpolymers are obtained from ethyl acrylate, methacrylic acid and vinyl isobutyl ether.

The polymers according to the invention can be used in many different ways, and can be stored in the form of a granular material or can be processed to films, which is preferably directly performed from the melt obtained during polymerization. The polymers can also be shaped by conventional processes, such as deep drawing, injection moulding and compression.

The subject matter of the invention is also a water-shrinkable film. The film can be produced in conventional manner by extrusion or in a blowing process, it being expanded in at least one direction and thereby acquires a recovery or resetting capacity. It has now surprisingly been found that the film not only shrinks on heating, but as a result of its limited hydrophilic characteristics is able to absorb a certain quantity of water, which leads to the recovery. In the case of films preferably expanded in one direction, recovery is accompanied by a simultaneous thickness increase in the other direction. The recovery capacity of water can be more than half, accompanied by simultaneous stretching of the transverse direction in the range 30 to 60%. This property of the aforementioned polymers is surprising and offers a wide variety of possible uses.

It is also possible to utilize the shrinkage properties of the polymers in bodies other than films. Thus, the polymers can be used in the form of rods, threads, knitted and woven fabrics, whereby use is made of their shrinkage properties.

The invention also relates to plastic articles, particularly thin-walled plastic articles, e.g. films and plates, which are at least partly formed from thermoplastic material, which is insoluble in a neutral aqueous medium, but is soluble in a non-neutral, particularly a basic medium, and in which said material engages on the surface on both sides, at least at individual points of the articles.

Whereas in the case of the known composite film, the water-insoluble material, which is soluble in a basic medium was always connected in full-surface manner with a water-soluble material in the sandwich, and the water-insoluble material provided the mechanical support for the composite film, it has now been found that the polymer, which is insoluble in water, but soluble in an acid or basic medium can be processed to independent articles, such as injection moulded articles, deep drawn articles and the like, as can be produced e.g. from the melt, particularly by extrusion, moulding or blowing, preferably in a non-porous manner. The material soluble in the acid or basic medium then preferably extends over the entire thickness of the article at the individual sites. This thickness or wall thickness of the article is generally 5 micrometers to 2 mm. In special cases, it can be even greater. It is generally approximately 40 to 500 micrometers and in particular 40 to 120 micrometers, at least in the case of films and thin deep drawn parts. Larger wall thicknesses can occur, if the dissolving time can be correspondingly long.

The articles according to the invention have the advantage that they are insoluble as such against neutral water and can then be dissolved by an external solubilizer, e.g. an alkaline aqueous solution, particularly a dilute ammonia solution. This applies in particular for those articles, which are completely made from a thermoplastic material, which is insoluble in a neutral aqueous medium, but is soluble in a basic medium.

However, it is also possible to form the articles according to the invention from different materials, preference being given to two possibilities. According to one possibility in juxtaposed manner and particularly substantially in one coating, sites formed from materials insoluble in the aqueous medium, e.g. normal thermoplastics, can alternate with sites made from those thermoplastics which are soluble in acid or basic media.

After dissolving the soluble points, only the insoluble points are left. This is advantageous for many applications, particularly if the film is to be used as an adhesive film and the adhesive coating has to be subsequently made porous or permeable. The different materials can then be juxtaposed in strip-like manner, so that after dissolving only the strips of the insoluble material remain. It is also possible to provide the insoluble material in a continuous surface extension, the soluble material taking up individual points, so that after dissolving the soluble material a grid, a perforated film or the like is obtained. Conversely, it is possible to provide the soluble material with a continuous surface extension and the insoluble material as a discontinuous surface extension, so that after dissolving the soluble material in the acid or basic medium, only the individual sites of the insoluble material are left.

Similarly, juxtaposed sites of material insoluble in water, but soluble in an alkaline or acid medium can alternate with sites of materials soluble in neutral water, so that the latter already permits a partial dissolving of the article. It is also possible to juxtapose materials insoluble in an aqueous medium, soluble in the basic medium and soluble in water, so that here different solubility stages are obtained side by side. The article can once again be in one-coating form, and the individual materials can be juxtaposed in the coating. However, it is also possible for the individual materials to reciprocally overlap at the junction lines, particularly if they are joined by welding together.

It is also possible according to the invention for partial surfaces of the material soluble in the acid or basic medium of the article according to the invention to be coated with at least one coating, which can be disintegrated in water and contains a basic or acid solubilizer, or itself acts in a basic or acid manner. The coating can merely absorb water and react in an acid or basic manner. However, it can also soften or dissolve in water. It is also possible by corresponding formulation of this coating to control the time within which the water is able to penetrate the disintegratable coating and penetrate through to the water-insoluble coating. Since, alongside the partial surfaces of the coated material, there are surfaces of uncoated material, which is insoluble in water, but soluble in an acid or basic medium, as a function of the basicity or acid action of the coating, different results can be obtained. In the case of strong basic or acid coatings, the basicity or acid capacity can be adequate to also dissolve the adjacent, uncoated parts of the material which is not soluble in water. If the degree of acidity or the basicity is made correspondingly weaker, only the directly coated points dissolve, so that here again numerous new design possibilities are provided by a corresponding distribution of the coating having a dissolving action.

The material which is insoluble in water, soluble in basic medium is preferably formed from the aforementioned copolymers and/or terpolymers.

There are numerous new possible uses of the articles according to the invention, particularly if they are in the form of films. Thus, the film can be used as a protective film, which can be dissolved by an external solubilizer if it is no longer used. For example, this is the case with protective films for metal surfaces and agricultural films. The film can also be used as a protective coating for new cars. For example, use can be made here of the shrinkage characteristics of the film. The film can also be used as a packaging film, or as a separating film, if certain substances are to be stored so as to only be temporarily separated from one another. The articles according to the invention can also be used in the form of pot-like deep drawn parts, e.g. as plant pots, which are then dissolved in the soil after a certain time. The film can also be used as a barrier film in plastic moulds in the case of curable plastic materials, particularly foams, according to the deep drawing process and can be at least partly removed by dissolving after use.

EXAMPLE 1

Into a double-walled stirred container cooled to 20° C. are dissolved 300 mol (30 kg) of ethyl acrylate, 100 mol (8.6 kg) of methacrylic acid, 25 mol (67 kg) of tridecyl methacrylate and 0.5 kg of azodiisobutyronitrile to enable the liquid to be pumped at a rate of 10 kg/hour into the feed zone of a tightly meshing twin-screw extruder rotating in the same direction and with a diameter of 60 mm and a length of 2580 mm. The extruder, referred to hereinafter as the reactor, had ten heatable and coolable zones. The feed zone temperature was 60° C., zones 2 to 6 were at 110° C., zones 7 and 8 at 170° C. and zones 9 and 10° at 130° C. Zone 8 had an attachment for distilling off unpolymerized monomers. With a reactor speed of 50 r.p.m. and a current consumption of 30 A, approximately 0.8 kg of liquid was distilled off per hour.

The polymer contained in the reactor was directly fed via melt pipe into a second tightly meshing twin-screw extruder rotating in the same direction and with a diameter of 30 mm and a length of 1300 mm. This extruder is subsequently referred to as the compounder. The compounder had four heatable and coolable zones. Zones 1 and 2 (considered from the reactor) were at 130° C., zone 3 at 150° C., zone 4 (the extruder head) at 120° C., and zone 3 had a vacuum device for removing residual monomers. The polymer left the compounder in the form of strands, which were cooled on a cooling roller and granulated in a granulator. The granular material had an analytically determined carboxyl group content of 5.1% (theory 4.3%). However, the polymer can also be directly extruded to a film.

The granular material is then melted again in a further extruder at 140° to 150° C. and (a) was processed by means of a slot die to a transparent film of approximate width 20 cm and thickness 50 μ.

The granulate was then (b) remelted in a compounder and processed by means of a blowing mechanism to a transparent film of width approximately 50 cm to 5 m and thickness 50 μ.

EXAMPLE 2

400 mol (40 kg) of ethyl acrylate, 100 mol (8.6 kg) of methacrylic acid, 25 mol (2.5 kg) of vinylisobutyl ether and 0.55 kg of azodiisobutyronitrile were idssolved in a double-walled stirred container, cooled to 20° C. and the liquid was supplied to the feed zone of the reactor at a rate of 14 kg/h, further processing taking place according to Example 1. At a reaction speed of 20 r.p.m. and a current consumption of 20 A, 1.1 kg of liquid was distilled off hourly.

Melt flow index: 11.9 g/10 min at 150° C.

Carboxyl group content: 10.8% (theory 8.8%).

EXAMPLE 3

420 mol (42 kg) of ethyl acrylate, 100 mol (8.6 kg) of methacrylic acid, 25 mole (2.5 kg) of vinylisobutylether, 1.5 kg of stearyl alcohol and 0.55 kg of azodiisobutyronitrile were dissolved in a doublewalled stirred container, cooled to 20° and the liquid was polymerized at a rate of 14 kg/h in the reactor, as in Example 1.

At a reactor speed of 20 r.p.m. and a current consumption of 25 A 1.4 kg of liquid was distilled off hourly.

Melt flow index: 25.6 g/10 min at 150° C.

Carboxyl group content: 8.9% (theory 8.5%).

Films made from material 3 were more hydrophobic than films made from material 2.

EXAMPLE 4

400 mol (40 kg) of ethyl acrylate, 100 mol (8.6 kg) of methacrylic acid, 30 mol (3.8 kg) of butyl acrylate and 0.52 kg of azodiisobutyronitrile were dissolved in a double-walled stirred container, cooled to 20° C. and the liquid was processed at a rate of 12 kg/h, as in Example 1. At a reactor speed of 30 r.p.m. and a current consumption of 22 A, 1.2 kg of liquid was distilled off hourly.

Melt flow index: 17.7 g/10 min at 150° C.

Carboxyl group content: 9.4% (theory 8.7%).

Films made from material 4 are slightly tacky.

Characteristics of methacrylic acid copolymers

| Ex. | Formulation (mol, unless otherwise stated) | Melt index | Carboxyl content theor. % | Carboxyl content mes. % | Tear strength N/mm² | Breaking strain % | Density g/cm³ |
|---|---|---|---|---|---|---|---|
| 5 | 3 EA × 1 MAS | 8.8/150° | 11.6 | 12.4 | 12.0 | 100 | 1.16 |
| 6 | 3 EA × 1 MAS 0.25 VIBE | 8.7/150° | 10.9 | 11.4 | 13.7 | 120 | 1.14 |
| 7 | 3 EA × 1 MAS 0.25 VIBE × 3% STA | 11.2/150° | 10.6 | 11.5 | 13.8 | 80 | 1.14 |
| 8 | 3 EA × 1 MAS 0.25 BA | 11.4/150° | 10.8 | 11.3 | 9.7 | 100 | 1.15 |
| 9 | 4 EA × 1 MAS | 8.4/150° | 9.2 | 10.4 | 10.9 | 75 | 1.15 |
| 2 | 4 EA × 1 MAS 0.25 VIBE | 11.9/150° | 8.8 | 10.8 | 10.2 | 200 | 1.15 |
| 10 | 4 EA × 1 MAS 0.25 VIBE × 3% STA | >20/150° 4.0/120° | 8.5 | 11.6 | 10.2 | 320 | 1.14 |
| 11 | 4 EA × 1 MAS 0.25 BA | 17.7/150° 1.5/120° | 8.7 | 10.7 | 7.1 | 280 | 1.14 |
| 12 | 4 EA × 1 AS 0.19 styrene | 7.3/130° | 9.1 | 11.4 | 3.1 | 720 | 1.13 |
| 13 | 5 EA × 1 MAS | >20/150° 2.1/120° | 7.7 | 8.8 | 5.9 | 140 | 1.14 |
| 14 | 5 EA × 1 MAS 0.25 VIBE | 19.4/150° 1.9/120° | 7.4 | 8.5 | 5.9 | 100 | 1.13 |
| 15 | 5 EA × 1 MAS 0.25 VIBE × 3% STA | >20/150° 2.7/120° | 7.1 | 8.4 | 6.4 | 110 | 1.13 |
| 16 | 5 EA × 1 MAS 0.25 BA | >20/150° 2.3/120° | 7.3 | 8.2 | 5.9 | 300 | 1.13 |

(a) In each case polymerized with 6 mmol of azo-bis(-butyronitrile)/mol of monomer. EA=ethyl acrylate, MAS=methacrylic acid, VIBE=vinyl isobutyl ether, STA=stearyl alcohol, AS=acrylic acid, BA=n-butylacrylate.
(b) Melt flow index according to DIN 53 735
(c) g of COOH in 100 g of polymer, measured by titration.
(d) Tested with approximately 100 μm thick pressed films according to DIN 53 455, testing rate 100 mm/min.

EXAMPLE 17

Shrinkage tests in water with extruded films.

Using a polymer of 4 mol of ethyl acrylate per mol of methacrylic acid and 0.25 mol of vinyl isobutyl ether (Example 2), extruded films were produced, namely as (2) flat film and
(1) blown film (collapsed tube).

From different films were cut samples of 10 cm (along the removal direction)×15 cm (crossways). The samples were then kept in water for 30 minutes at 25° C., allowed to dry and measured.

| Film no. | Thickness previously | Thickness subsequently | Change longways | Change crossways |
|---|---|---|---|---|
| (a)(1) | ~50μ | ~110μ | −67% | +32.7% |
| (b)(1) | ~45μ | ~130μ | −67% | +26.7% |
| (c)(2) | ~45μ | ~110μ | −72% | +50% |
| (d)(2) | 30–35μ | 80–90μ | −76% | +60% |
| (e)(2) | ~25μ | ~60μ | −79% | +50% |
| (f)(2) | 75–80μ | ~180μ | −62% | +33.3% |
| (g)(2) | ~40μ | ~110μ | −67% | +40.7% |

A film made from 4 mol ethyl acrylate per mol of acrylic acid and 0.19 mol of styrene (cf. Example 12) also has a water shrinkage, namely −53% longways and +10% crossways.

EXAMPLE 18

400 mol (40 kg) of ethyl acrylate, 100 mol (8.6 kg) of methacrylic acid, 730 g (1.5%) of dilauryl peroxide and 120 g (0.25%) of tetradecyl mercaptan were dissolved in a double-walled stirred container cooled to 20° C. and transferred to an intermediate container. The homogeneous solution was pumped from the latter at a rate of 16 kg/hour into the feed zone of a tightly meshing twin-screw extruder rotating in the same direction with a diameter of 60 mm and a length of 2580 mm. The extruder has ten zones, which were heatable and/or coolable according to the invention. The feed zone was cooled to 20° C., zones 2 to 4 were at 100° C., zone 5 at 110° C., zone 6 at 120° C., whilst zone 8 had an attachment for distilling off unpolymerized monomers and had a temperature of 160° C. Zones 9 and 10 were at 145° C.

With a screw speed of 50 per minute and a current consumption of 40 A, approximately 0.6 kg of liquid was distilled per hour (approx. 96% conversion). The polymer was removed from the extruder head in five strands, cooled on cooling rollers and granulated. The granular material was degassified in a second extruder at 160° C. in a vacuum of 1 Torr. Simultaneously 5% stearic acid was compounded in, the polymer melt was extruded at 145° C. by means of a slot die to form a film. It can also be directly coated on to a 100 μm thick film of hydroxypropyl cellulose (Hercules Klucel H), containing 20% soda and removed from an upstream unwinding station. The coating thickness was 30 μm.

The thus obtained composite film is waterproof on contact with water for the coating side, whereas on contact with water from the hydroxypropyl cellulose side, the complete film dissolved. If the ethyl acrylate -methacrylic acid copolymer film is only coated in strip-like manner or at individual points with the solubilizer-containing material, then essentially only the coated points are dissolved in water.

EXAMPLE 19

400 mol (40 kg) of ethyl acrylate, 100 mol (8.6 kg) of methacrylic acid, 730 g (1.5%) of dilauroylperoxide and 120 g (0.25%) of tetradecylmercaptan are dissolved in a double-walled stirred container cooled to 20° C. and transferred into an intermediate container. The homogeneous solution was removed from the latter at a rate of 16 kg/hour and pumped into the feed zone of a tightly meshing twin-screw extruder rotating in the same direction and having a diameter of 60 mm and a length of 2580 mm. The extruder had ten zones, which were heatable and/or coolable according to the invention. The feed zone was cooled to 20° C., whilst zones 2 to 8 were at 105° C. and zones 9 and 10 at 145° C. By means of a temperature-controllable melt pipe, the reaction extruder head was directly connected to a second extruder (cascade connection).

The first zone of the second extruder had an attachment for distilling off the unpolymerized monomers. Its temperature was 160° C. With a screw speed of 50 per minute and a current consumption of 40 A in the first extruder (reaction extruder) 0.15 kg of liquid per hour (approximately 99% conversion) were distilled off from the distillation attachment of the second extruder (degasified and compounding extruder). The polymer melt was degasified at 160° C. in a vacuum of 1 Torr in zones 2 to 4 of the compounding extruder. In zones 5 to 7, 5% stearic acid was mixed in at 145° C. In the manner described in Example 1, the stearic acid-containing polymer melt from zone 8 was applied at 145° C. from a slot die on to the soda-containing hydroxypropyl cellulose film.

The characteristics of the overall film were similar to those of Example 1. The polymer melt can also be processed to a granular material or to a one-coating film.

EXAMPLE 20

100 mol (8.6 kg) of vinyl propyl ether, 300 mol (47.2 kg) of dimethyl aminoethyl methacrylate, 280 g (0.5%) of azoisobutyric nitrile and 112 g (0.2%) of β-nitrostyrene were dissolved in a doublewalled stirrer container cooled to 20° C. and transferred to an intermediate container. The homogeneous solution was pumped from the latter at a rate of 32 kg/hour into the feed zone of a tightly meshing twinscrew extruder rotating in the same direction and with a diameter of 60 mm and a length of 2580 mm. The extruder has ten zones, which were heatable and coolable according to the invention. The feed zone was cooled to 20° C., zones 2 to 8 were at 120° C. and zones 9 and 10 at 145° C. By means of a temperaturecontrollable melt pipe, the reaction extruder head was directly connected to a second extruder (cascade connection).

The first zone of the second extruder had an attachment for distilling off unpolymerized monomers, and was at 170° C. With a screw speed of 75 per minute and a current consumption of 30A in the first extruder (reaction extruder) on average 2.5 kg of liquid/hour (approximate conversion 92%) were drawn off from the distillation attachment of the second extruder (degasifying and compounding extruder). In compounding extruder zones 2 to 4, the polymer melt was degasified at 170° C. in a vacuum of 1 Torr. 20% 2-amino-2-methyl-1,3-propane diol (Ammediol, AMPD) was compounded into zones 5 to 7 at 145° C. The AMPD-containing polymer melt from zone 8 was then introduced at 145° C. into the first channel of a 2-channel slot die. The stearic acid-containing polymer melt from zone 8 and described in Example 2 was introduced into the second channel of said die and a composite film was produced by coextrusion.

The composite film was approximately 150 μm thick. The stearic acid-containing side of the film (ethyl acrylate - methacrylic acid copolymer) was approximately 50 μm thick and waterproof. The AMPD-containing side of the composite film (dimethyl aminoethyl methacrylate - vinyl propyl ether copolymer) was approximately 100 μm thick and when in contact with water from this side, the complete film dissolved.

The production of thermoplastics and optionally also their processing can take place continuously with the aid of one or more extruders, in that the starting products or the mixture thereof are continuously fed into the extruder. Following work stoppages a controlled heating is adequate to melt the products which have solidified in the extruder and so that production can be continued.

The films and other articles produced with the polymers according to Examples 1 to 16 are very resistant to hard and soft water, as well as rain water. However, if the film is brought into contact with an aqueous basic solution, it rapidly dissolves. Examples of bases are ammonia, sodium carbonate, sodium bicarbonate, sodium metasilicate, triammonium phosphate, etc. In the case of ammonia, the film can initially be treated with gaseous ammonia and dissolving then takes placed on contact with neutral water. Caustic soda solution an also be used. Through being water-soluble and base-soluble, the film is very suitable for use as a temporary protective or covering film, as well as an intermediate film in processing operations.

POSSIBLE USES

Protective car packing

Prior to transportation from the factory to wholesalers, cars are coated with a protective wax, which has to be removed at the wholesalers, both processes being time-consuming and prejudicial to the environment.

The aforementioned film with a width of 2 to 5 m can be shrunk on to the car in the car factory and can then be easily removed at the wholesaler's by pouring a 0.5% by weight ammonia solution plus wetting agent on to it, e.g. in a car washer.

Overseas packaging

Metal parts which are liable to corrosion are coated with a wax coating to protect them against salt-containing atmosphere prior to overseas transportation and this has to be removed again on arrival. By enveloping the parts in the aforementioned film, and then by treating with ammonia solution, it is here again very easily possible to provide protection against corrosion and easy removal.

Protection of high-gloss surfaces

High-gloss surfaces (e.g. polished metal parts, glasses) are coated with films to protect against scratching. The protective films can only be partly scraped off, i.e. the high-gloss surface can be damaged on removing the protective film. By coating with the aforementioned film and treating with an ammonia solution, this disadvantage can be obviated.

Agricultural film

High-value crops are temporarily protected by films against bird damage, moisture losses, heat losses, wind erosion, etc. The removal of these films is time-consuming and difficult. The film according to the invention can be dissolved by spraying with dilute ammonia solution, the latter having a fertilizing and soil conditioning action. A nitrate-containing triammonium phosphate solution can be used in place of the ammonia solution.

Hospital washing packaging

Dirty washing is packed in bags and must be unhygienically removed therefrom prior to washing. Bags made from the aforementioned film can be directly introduced into washing machines, where they are dissolved by the detergent solution.

Animal feed portion packs

Dog, cat and fish food can be packed portionwise in bags made from the aforementioned film, the bag containing the necessary quantity of a necessary solubilizer, such as sodium carbonate or soda for dissolving the film. On use, the bag is torn open and poured into the food dish with water. The film dissolves and the food is accessible in a hygienic manner. Fish food packs can be placed directly in the aquarium.

Technical intermediate film

The production of car seat cushions, an elastic foam body is initially expanded in a deep drawing process. The foam body is fixed to a film required for deep drawing purposes. This film is subsequently used as a perspiration barrier between the textile seat covering and the foam body and consequently prevents comfortable sitting. The separation of the deep drawn film from the actual foam body would lead to a labour-intensive operation.

The film according to the invention can now be used as the deep drawn film and areas thereof can be made from an ammonia-insoluble thermoplastic material forming a connection between the actual foam body and the textile seat covering. If the thus produced car seat is treated with ammonia water, the ammonia-soluble parts of the deep drawn foil disappear, so that a good water vapour diffusion is made possible.

It is also possible to treat the finished car seat with gaseous ammonia at approximately 100° C. Due to the ammonium salt formation, parts of the deep drawn film become brittle, crumble and permit water vapour diffusion.

Partial dissolving of the film

The described film can be provided with a pattern consisting of a solid base, said pattern consisting of dots, lines, strips and round or angular surfaces.

A meltable base such as e.g. glycine amide (m.p. 66° C.) or guanidine (m.p. 50° C.) can be melted on for producing the pattern. The melting point of the base must be below the melting point of the film. It is also possible to intimately mix a base which is not meltable at temperature <200° C., such as e.g. soda, sodium metasilicate or caustic soda with a low-melting, water-soluble compound, such as e.g. acetamide (m.p. 81° C.) and melt it on to the film.

It is also possible to intimately mix the aforementioned bases with a water-soluble, non-meltable polymer, such as e.g. methyl cellulose, sodium carboxymethyl cellulose, hydroxyethyl cellulose, polyvinyl alcohol or polyvinyl pyrrolidone, as well as smaller quantities of a solvent and then to press the mixture on to the film.

If a thus prepared film comes into contact with water, the base-covered parts of the film dissolve and a predeterminable pattern is obtained.

We claim:

1. An extruded water insoluble, basic medium soluble, thermoplastic polymer prepared from a monomer mixture comprising from about 2.5 to about 6 mol of at least one of methylacrylate and ethylacrylate per mol of at least one of acrylic acid and methacrylic acid, and a termonomer selected from the group consisting of a vinyl ether having 3 to 18 carbon atoms and a vinyl hydrocarbon having 8 to 11 carbon atoms, the acid mol ratio to termonomer mol ratio being 1:0.1 to 1:0.4, said polymer having a carboxylic group content of between about 5 and 15%.

2. The thermoplastic polymer of claim 1, wherein said vinyl ether is vinyl isobutyl ether.

3. The thermoplastic polymer of claim 1, wherein said vinyl hydrocarbon is styrene.

4. The thermoplastic polymer of claim 1, wherein the molar ratio of the at least one acrylate to the at least one of acrylic acid and methacrylic acid is between about 3:1 to about 5:1.

5. A thermoplastic polymer of claim 1, wherein the molar ratio of the at least one of acrylic acid and methacrylic acid to termonomer is between about 1:0.1 to about 1:0.4.

6. The thermoplastic polymer of claim 1 comprising ethyl acrylate, methacrylic acid and vinyl isobutyl ether.

7. The thermoplastic polymer of claim 1 comprising ethyl acrylate, methacrylic acid and styrene.

* * * * *